United States Patent Office 3,423,190
Patented Jan. 21, 1969

3,423,190
PLUTONIUM TETRAFLUORIDE PREPARATION AND SEPARATION BY SORPTION ON SODIUM FLUORIDE
Martin J. Steindler, Park Forest, and Albert A. Jonke, Elmhurst, Ill., assignors to the United States of America as represented by the United States Atomic Energy Commission
No Drawing. Filed Dec. 14, 1967, Ser. No. 690,428
U.S. Cl. 23—326
Int. Cl. C01f 17/00; C22b 61/00
9 Claims

ABSTRACT OF THE DISCLOSURE

Plutonium is separated from uranium and fission products present in an irradiated fuel element by fluorinating the element in a fluidized bed and passing the volatile hexafluorides thus formed through a settled bed of sodium fluoride. The sodium fluoride with the plutonium, uranium and fission products sorbed thereon is heated to 400° C. and flushed with fluorine to remove the uranium and volatile fission product fluorides. The sodium fluoride is alternately washed with liquid anhydrous hydrogen fluoride and liquid bromine pentafluoride which dissolves the sodium fluoride and leaves a purified precipitate of plutonium tetrafluoride.

CONTRACTUAL ORIGIN OF THE INVENTION

The invention described herein was made in the course of, or under, a contract with the United States Atomic Energy Commission.

BACKGROUND OF THE DISCLOSURE

Plutonium is generally produced in a thermal reactor and must be separated and recovered during reprocessing of the reactor fuel. Breeder reactors are now being designed with the purpose of converting uranium[238] to plutonium simultaneously with the production of power. It is clear, therefore, that while plutonium separation and recovery was important in the past, it is even more so now. The fluoride volatility process is one of the processes under development for reprocessing spent nuclear fuel from a breeder reactor.

In the fluoride volatility process, after the cladding material has been removed and the element pulverized, the fuel is oxidized and thereafter fluorinated by one of two methods. In the first method, oxidized fuel is converted to the fluorides with elemental fluorine gas. Plutonium, uranium, neptunium, antimony, niobium, ruthenium, technetium, tellurium and molybdenum are all converted to volatile fluorides which leave the bed as a gas. The lanthanide rare earth fission products are converted to fluorides, but they are nonvolatile and remain in the fluidized bed.

A second method of fluorinating the oxidized fuel involves two steps. The oxidized fuel is first fluorinated with bromine pentafluoride. All the volatile fluorides previously mentioned leave the bed as an off-gas except the plutonium which is converted to the nonvolatile tetrafluoride. After the bromine pentafluoride fluorination, the plutonium tetrafluoride is converted to the volatile hexafluoride with fluorine gas.

Whether the one or two-step fluorination method is used, the off-gas will contain material other than plutonium hexafluoride. In the one step method, major amounts of uranium and fission product fluorides will be present while in the two-step method only minor amounts of these materials appear in the off gas. Even if the two-step method is used, the off-gas must be treated to separate and purify the plutonium.

It is known that uranium, plutonium and some fission products sorb onto solid sodium fluoride and at least some of these elements form complexes therewith. In the case of plutonium the complex at 100° C. is probably $3NaF \cdot PuF_4$. Heretofore, a simple process has not been available by which plutonium tetrafluoride can be separated from the complex and purified of any entrained contaminants.

It has been found that plutonium may be separated from a sodium fluoride-plutonium complex by dissolving the sodium fluoride with liquid anhydrous hydrogen fluoride. It has been further found that temperature control of the absorption of plutonium, uranium and various fission products by the sodium fluoride followed by fluorination of the sodium fluoride at elevated temperatures combined with alternate washes of liquid anhydrous hydrogen fluoride and liquid bromine pentafluoride produce a separated and purified plutonium tetrafluoride product.

The separation and purification process outlined above has certain advantages over existing procedures. The handling of plutonium as plutonium hexafluoride is reduced; therefore, costly plutonium losses due to decomposition and/or reaction of plutonium hexafluoride are almost eliminated. Extensive refluorination of plutonium from lines, valves and other apparatus is removed, thus eliminating the need for equipment capable of withstanding high temperatures in fluorinating atmospheres. The efficiency of absorption of plutonium hexafluoride by sodium fluoride exceeds 99% and the process product, plutonium tetrafluoride, is an easily handled solid. Although the process of this invention is applicable to either fluorination method described herein, the two-step method will be selected for illustrative purposes.

In the two-step fluorination method, the second-step off-gas contains plutonium hexafluoride, uranium hexafluoride, neptunium hexafluoride and varying quantities of the volatile fluorides of antimony, niobium, ruthenium, technetium, tellurium and molybdenum as well as elemental fluorine gas mixed with a diluent. Proper temperature control during absorption of these fluorides by the sodium fluoride determines, to a large extent, which and how much of the various fission products sorb onto the sodium fluoride.

While sodium fluoride retains over 99% of the plutonium from a stream of plutonium hexafluoride mixed with fluorine at temperatures from ambient to around 600° C., ruthenium, antimony and niobium are only slightly sorbed on sodium fluoride at temperatures around 100° C. On the other hand, tellurium does not sorb on sodium fluoride while molybdenum sorbs at about 100° C. but is desorbed at about 150° C. Technetium, uranium and neptunium are similar in that they sorb at temperatures under about 150° C. but desorb at temperatures around 400° C. It may be seen from the above that if the off-gas is introduced into a settled bed of sodium fluoride maintained between about 100° C. and 150° C. followed by flushing the sodium fluoride bed with fluorine at a temperature of about 400° C., most of the uranium and fission products in the off-gas either will not sorb on or desorb from the sodium fluoride. In fact, it has been found that except for ruthenium, antimony and niobium, the other constituents of the fluorination off-gas are adequately removed by the above procedure.

After the sodium fluoride has been flushed with fluorine gas at about 400° C., it is cooled to ambient temperature and washed with liquid anhydrous hydrogen fluoride. The hydrogen fluoride is a good solvent for both antimony and niobium and in addition dissolves the sodium fluoride. After the hydrogen fluoride wash liquid is separated, a plutonium tetrafluoride solid contaminated only with trace amounts of ruthenium remains. The ruthenium may be removed from the plutonium tetrafluoride by successive washes with hydrogen fluoride and bromine pentafluoride. The process of this invention may be better understood by reference to the following examples:

EXAMPLE I

Plutonium tetrafluoride-sodium fluoride pellets were prepared by sorbing 0.75 gram of plutonium hexafluoride on 0.55 gram of sodium fluoride pellets at 100° C. Approximately 0.7 gram of these coated pellets was placed in a test tube which was evacuated. Gaseous hydrogen fluoride was introduced into the tube and the tube was cooled with liquid nitrogen, thereby condensing the hydrogen fluoride to a liquid. Approximately 1 milliliter of liquid anhydrous hydrogen fluoride was added as determined by PVT measurements. The hydrogen fluoride remained in the test tube for about one hour and then was removed by pressurizing the vessel with nitrogen. The coated sodium fluoride pellets disintegrated in less than one-half hour after the system reached room temperature and a light colored precipitate remained. The precipitate was washed once with one milliliter of liquid hydrogen fluoride for one hour and then the hydrogen fluoride was removed and the precipitate dried. The precipitate was light buff in color and weighed 0.35 gram compared to a theoretical weight of 0.39 gram if the precipitate is assumed to contain all of the plutonium tetrafluoride. Analysis of the precipitate by X-ray diffraction indicated the major component of the precipitate to be plutonium tetrafluoride.

EXAMPLE II

The solubility of plutonium tetrafluoride in liquid hydrogen fluoride was determined by allowing a 0.294 gram sample of plutonium tetrafluoride to react with a 1.6 milliliter sample of hydrogen fluoride at room temperature for about 50 minutes. The precipitate was removed and weighed. About 1.3% of the plutonium tetrafluoride was dissolved by the liquid hydrogen fluoride which shows that the solubility of plutonium tetrafluoride in liquid anhydrous hydrogen fluoride is low.

EXAMPLE III

A mixture consisting of 0.52 gram of sodium fluoride containing ruthenium[106] and niobium[95] and 0.51 gram of sodium fluoride pellets containing 54.7 weight percent plutonium tetrafluoride was prepared and placed into a reaction vessel. Four additions of hydrogen fluoride varying from 1 to 2.7 milliliters were made to the reaction vessel by cooling the vessel in a liquid nitrogen bath and condensing gaseous hydrogen fluoride from a calibrated volume. The bulk of the liquid hydrogen fluoride was removed before the next addition by pressurizing the reaction vessel with nitrogen. After the second and fourth additions of hydrogen fluoride, the undissolved solids in the reaction vessel were weighed and the ruthenium[106] and niobium[95] activities determined with the aid of a germanium-lithium crystal. The data obtained in the runs are summarized in Table I.

TABLE I

Theoretical weight, $PuF_4$—0.28 g.
Initial activity, $Ru^{106}$—3.51×10² c./m./g.
Initial activity, $Nb^{95}$—5.87 c./m./g.

| Solvent | Vol. of solvent (ml.) | Weight undissolved solids (g.) | Activity $Ru^{106}$ | $Nb^{95}$ (c./m./g.) | D.F.* $Ru^{106}$ | D.F.* $Nb^{95}$ |
|---|---|---|---|---|---|---|
| HF | 1.0 | | | | | |
| HF | 1.6 | 0.31 | 2.22×10² | 0.77 | 1.6 | 7.5 |
| HF | 2.7 | | | | | |
| HF | 1.8 | 0.20 | 2.70×10² | | 1.3 | |
| $BrF_5$ | 1 | | | | | |
| $BrF_5$ | 2 | 0.17 | 1.67×10² | 0.3 | 2.1 | 19.3 |

*D.F.—Decontamination factor.

The decontamination factor is defined as the activity of the isotope in the plutonium tetrafluoride product plus the activity of the isotope in the filtrate solution divided by the activity of the isotope in the plutonium tetrafluoride product. The activity is defined as the counts per minute per gram of material.

The decontamination factors for ruthenium would indicate that another solvent must be used instead of or in combination with hydrogen fluoride in order to obtain satisfactory purification of the plutonium. The decontamination factor for niobium is such that liquid hydrogen fluoride can be used to remove niobium sorbed on solid sodium fluoride.

EXAMPLE IV

The undissolved solids from the above example were washed with 2 milliliters of bromine pentafluoride. The undissolved solids were weighed and the activities of ruthenium[106] and niobium[95] were determined. The decontamination factor for ruthenium increased from 1.3 or 1.6 to 2.1 and the decontamination for niobium increased from 7.5 to 19.3. It is clear from the above that improved decontamination factors can be achieved by washing with bromine pentafluoride.

EXAMPLE V

Sodium fluoride containing 49.6 weight percent plutonium tetrafluoride was contacted with a hydrogen chloride solution containing either ruthenium[106], niobium[95] or antimony[124]. The samples were allowed to air dry prior to dissolution with various solvents. The fission product chlorides were converted to the fluorides by the action of elemental fluorine at room temperature for about one day. Four additions of hydrogen fluoride were made to the sample containing ruthenium. The ruthenium activity was determined after the second and fourth additions. Two additions of bromine pentafluoride were made to the residue from the hydrogen fluoride dissolution and the ruthenium activity of the residue determined. Two additions of hydrogen fluoride were made to the samples containing niobium and antimony. The residue weights, volume of solvent, initial activities, final activities and decontamination factors are summarized in Table II.

TABLE II

Initial activities—$Ru^{106}$ 1.01×10⁵ c./m./g. $PuF_4$, $Nb^{95}$ 8.24×10⁴ c./m./g. $PuF_4$, $Sb^{124}$ 3.81×10⁴ c./m./g. $PuF_4$
Calculated weight of Pu—Ru experiment 0.198 g., Nb experiment 0.189 g., Sb experiment 0.219 g.

| Solvent | Volume solvent (ml.) | Weight residue (g.) | Activities, c./m./g. $PuF_4$ | | | D.F.* | | |
|---|---|---|---|---|---|---|---|---|
| | | | $Ru^{106}$ | $Nb^{95}$ | $Sb^{124}$ | $Ru^{106}$ | $Nb^{95}$ | $Sb^{124}$ |
| HF | 3.6 | 0.301 | 2.65×10⁴ | | | 3.8 | | |
| HF | 3.0 | 0.172 | 4.06×10⁴ | | | 2.5 | | |
| $BrF_5$ | 2.6 | 0.148 | 2.5×10⁴ | | | 4.0 | | |
| HF | 3.5 | 0.180 | | 9.95×10³ | | | 8.3 | |
| HF | 3.8 | 0.224 | | | 5.23×10² | | | 72.9 |

*D.F.—Decontamination factor.

While the decontamination factor for Table II is defined the same as for Table I, the activities are defined differently. In Table I the activities were expressed as counts per minute per gram of material, but there is a change in the matrix of the solids following dissolution with hydrogen fluoride. Since plutonium tetrafluoride is the only common compound between the dissolved and undissolved solids, it is more appropriate to express the activities as counts per minute per gram of plutonium tetrafluoride. The activities in Table II are so defined and, therefore, the decontamination factors calculated therefrom reflect the change. For instance, the decontamination factors in Table I for $Ru^{106}$ of 1.6 and 1.3 become 5.8 and 4.8 when activities based on counts per minute per gram of plutonium tetrafluoride are used. So also, the decontamination factor in Table I for $Nb^{95}$ of 7.5 becomes 25.9 when it is recalculated as above.

The decontamination factors for ruthenium and niobium in Table II are slightly lower than the recalculated values from Table I. It is possible that incomplete conversion of the chloride to the fluoride prevented larger decontamination factors. The decontamination factor of 72.9 for antimony clearly shows that antimony can easily be removed from plutonium tetrafluoride by dissolution in liquid anhydrous hydrogen fluoride.

EXAMPLE VI

A mixture of plutonium tetrafluoride and ruthenium metal was prepared as in the previous example, fluorinated and sorbed onto sodium fluoride. Three five milliliter portions of liquid hydrogen fluoride were added to the ruthenium contaminated sodium fluoride-plutonium tetrafluoride complex and each was allowed to remain in contact with the solid for one hour. The decontamination factor after the third portion of hydrogen fluoride was 59. The experiment was repeated but after the third portion of hydrogen fluoride was drained, the solid was heated and held at 50 to 60° C. for about one and a half hours in liquid bromine pentafluoride. The bromine pentafluoride was then filtered through the solids and the ruthenium activity and decontamination factors calculated. A decontamination factor of 200 was obtained, which is the highest value thus far obtained.

The above examples are only meant to be illustrative of the invention. The definition of the invention herein described follows in the claims.

What we claim is:

1. A process for producing plutonium tetrafluoride comprising forming a sodium fluoride-plutonium tetrafluoride complex by contacting sodium fluoride with plutonium hexafluoride, dissolving the sodium fluoride in the complex with liquid anhydrous hydrogen fluoride and separating the remaining solid plutonium tetrafluoride from the liquid.

2. The process of claim 1 wherein the plutonium tetrafluoride separated from the liquid hydrogen fluoride is further washed with liquid bromine penta flouride.

3. The process of claim 1 wherein the complex is formed at a temperature between about 100° C. and about 200° C.

4. In a process for recovering plutonium from a spent, clad fuel element containing plutonium, uranium and fission products thereof, comprising the steps of: removing and separating the clad from the element; pulverizing the element and introducing said pulverized element into a fluidized bed; oxidizing the element; fluorinating the element to produce plutonium hexafluoride and other volatile fluorides therefrom and collecting the plutonium hexafluoride and other volatile fluoride gases from the fluorination, the improvement comprising in combination the steps of: passing said gases through sodium fluoride particles heated to 100° C. to 150° C.; heating said particles to about 400° C. and passing fluorine gas therethrough; dissolving said sodium fluoride with liquid anhydrous hydrogen fluoride thereby leaving solid plutonium tetrafluoride and separating said liquid hydrogen fluoride from said solid plutonium tetrafluoride.

5. The process of claim 4 wherein fluorine gas is passed through said sodium fluoride particles at about 400° C. and thereafter the particles are cooled to ambient temperatures before dissolving said particles with liquid anhydrous hydrogen fluoride.

6. The process of claim 5 wherein said solid plutonium tetrafluoride separated from the liquid hydrogen fluoride is further washed with bromine pentafluoride.

7. The process of claim 6 wherein the plutonium tetrafluoride is digested with the bromine pentafluoride at temperatures of about 50° C. before the plutonium tetrafluoride is separated therefrom.

8. The process of claim 7 wherein the sodium fluoride particles are present as settled bed.

9. The process of claim 8 wherein the oxidized fuel element is first fluorinated by passing bromine pentafluoride gas upwardly through the fluidized bed and thereafter fluorinated by passing fluorine gas in a diluent upwardly through the fluidized bed to produce plutonium hexafluoride.

References Cited

UNITED STATES PATENTS 3,178,258   4/1965   Cathers et al. _____ 55—71

OTHER REFERENCES

Oak Ridge Nat. Lab., Chemical Technology Division Annual Progress Report, Ferguson et al., September 1966, ORNL. 3945, pp. 49, 67.

CARL D. QUARFORTH, *Primary Examiner.*

M. J. McGREAL, *Assistant Examiner.*

U.S. Cl. X.R.

23—324, 344